US010009816B2

(12) United States Patent  
Sato

(10) Patent No.: US 10,009,816 B2  
(45) Date of Patent: Jun. 26, 2018

(54) COMMUNICATION APPARATUS, METHOD OF CONTROLLING THE SAME, AND COMMUNICATION SYSTEM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/380,425

(22) Filed: Dec. 15, 2016

(65) Prior Publication Data

US 2017/0208520 A1    Jul. 20, 2017

(30) Foreign Application Priority Data

Jan. 15, 2016  (JP) ................. 2016-006557

(51) Int. Cl.
| | | |
|---|---|---|
| H04B 17/318 | (2015.01) | |
| H04L 12/801 | (2013.01) | |
| H04W 36/14 | (2009.01) | |
| H04W 36/00 | (2009.01) | |
| H04W 48/08 | (2009.01) | |

(Continued)

(52) U.S. Cl.
CPC .......... *H04W 36/14* (2013.01); *H04B 17/318* (2015.01); *H04L 47/29* (2013.01); *H04W 36/005* (2013.01); *H04W 36/0066* (2013.01); *H04W 48/08* (2013.01); *H04L 61/6081* (2013.01); *H04W 36/0061* (2013.01); *H04W 36/0083* (2013.01); *H04W 88/06* (2013.01); *Y02D 70/00* (2018.01); *Y02D 70/142* (2018.01); *Y02D 70/144* (2018.01); *Y02D 70/164* (2018.01)

(58) Field of Classification Search
CPC ...... H04W 36/14; H04B 17/318; H04L 47/29; H04L 61/6081  
See application file for complete search history.

(56) References Cited

U.S. PATENT DOCUMENTS

| 8,494,442 B2 | 7/2013 | Sato .................... H04L 63/0884 |
| 9,313,202 B2 | 4/2016 | Sato ........................... 455/11.1 |

(Continued)

FOREIGN PATENT DOCUMENTS

| EP | 1793531 A1 | 6/2007 |
| JP | 2010-124308 | 6/2010 |
| WO | 2015011520 A1 | 1/2015 |

OTHER PUBLICATIONS

European Search Report issued in corresponding European application No. 16203950.7 dated Mar. 31, 2017.

*Primary Examiner* — Qun Shen  
(74) *Attorney, Agent, or Firm* — Fitzpatrick, Cella, Harper & Scinto

(57) ABSTRACT

To more appropriately maintain a wireless communication connection, a communication apparatus obtains an identifier of a first network connected, by a first wireless communication scheme, to another communication apparatus; searches for a second network by the first wireless communication scheme, which exists on the periphery, and obtains an identifier of the second network; and transmits, if the identifier of the first network and the identifier of the second network are different, a predetermined notification signal to the other communication apparatus via communication by a second wireless communication scheme with lower transmission power than the first wireless communication scheme.

12 Claims, 8 Drawing Sheets

(51) Int. Cl.
*H04L 29/12* (2006.01)
*H04W 88/06* (2009.01)

(56) References Cited

U.S. PATENT DOCUMENTS

| | | | |
|---|---|---|---|
| 2004/0037249 A1* | 2/2004 | Chae | H04W 36/18 370/332 |
| 2011/0177780 A1* | 7/2011 | Sato | H04W 36/14 455/41.1 |
| 2011/0216744 A1* | 9/2011 | Taaghol | H04W 48/18 370/332 |
| 2013/0081121 A1* | 3/2013 | Green | H04L 9/0827 726/7 |
| 2013/0178160 A1 | 7/2013 | Wang | |
| 2014/0233386 A1* | 8/2014 | Jamadagni | H04W 36/22 370/235 |
| 2014/0302849 A1* | 10/2014 | Palin | H04W 8/005 455/436 |
| 2015/0172968 A1* | 6/2015 | Lund | H04W 36/0066 455/411 |
| 2016/0066248 A1 | 3/2016 | Sato | H04W 40/22 |
| 2016/0198385 A1* | 7/2016 | Braun | H04W 36/0094 455/437 |

* cited by examiner

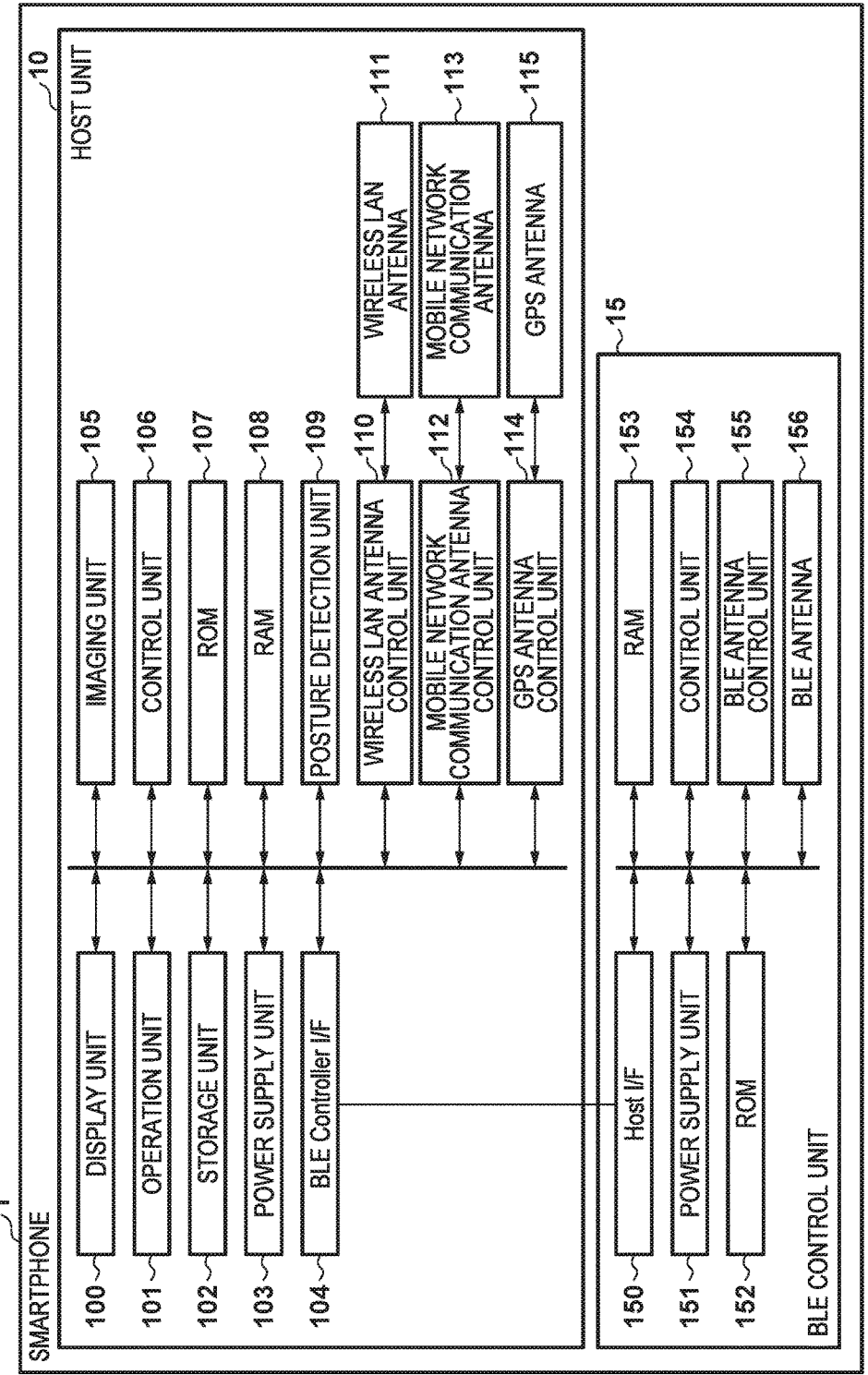

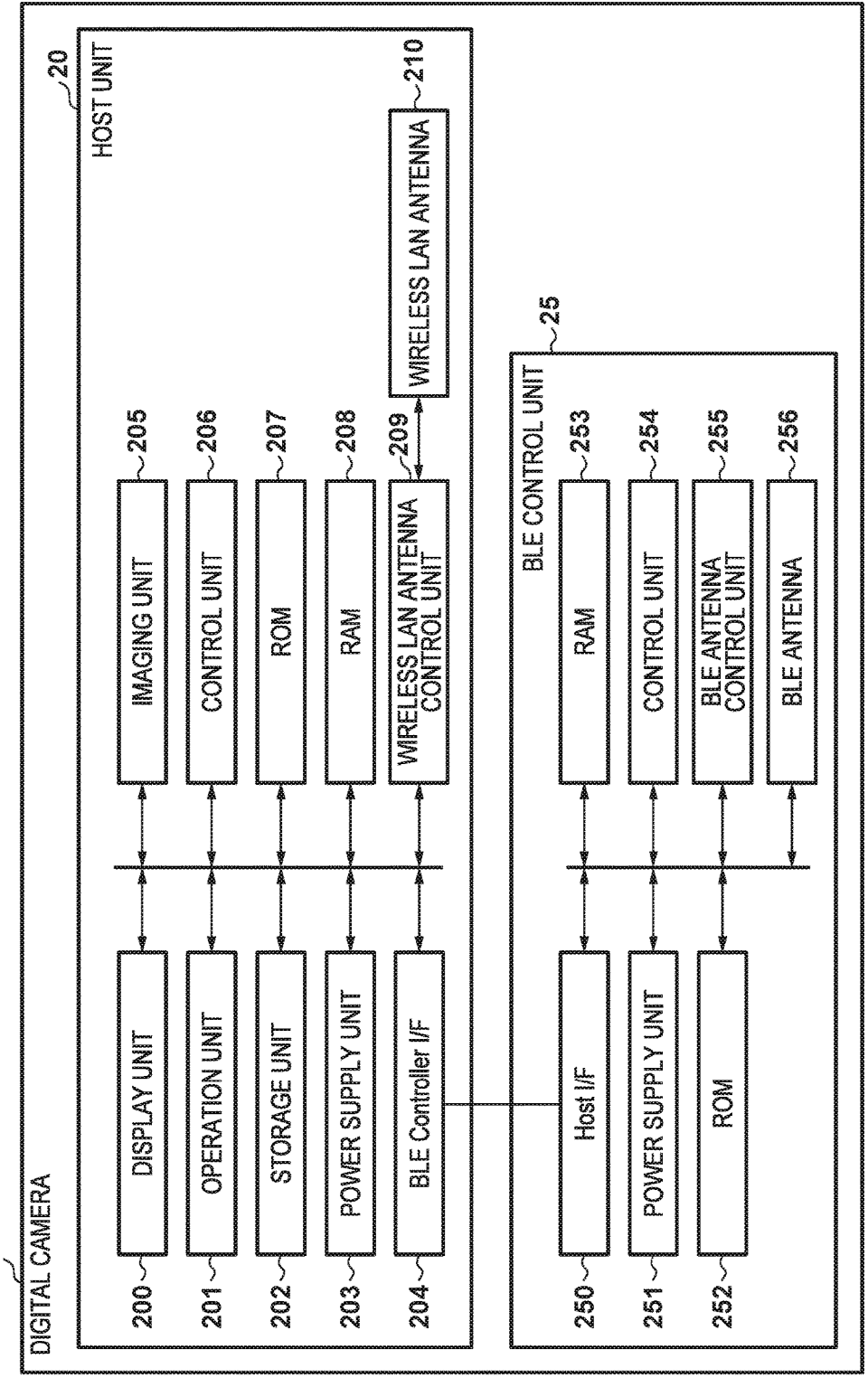

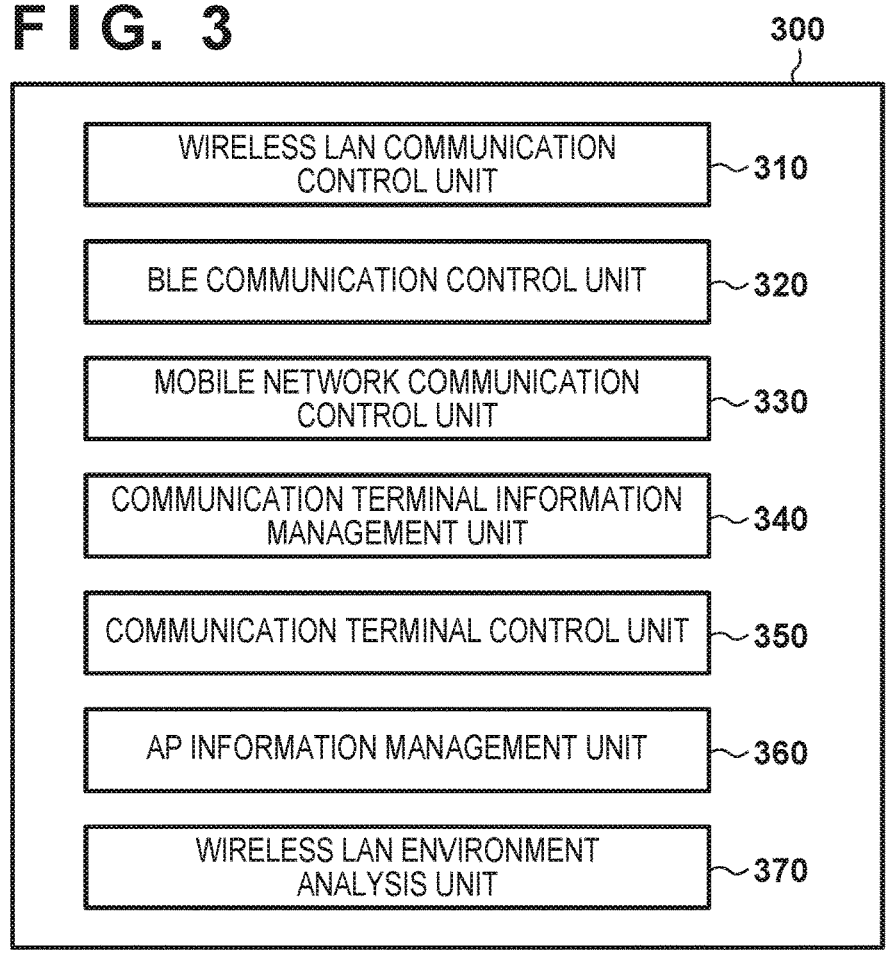
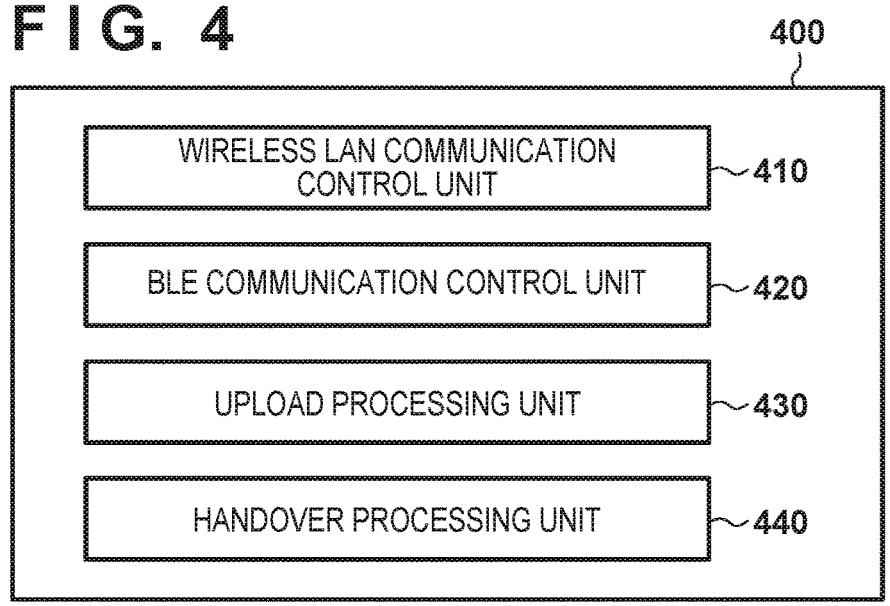

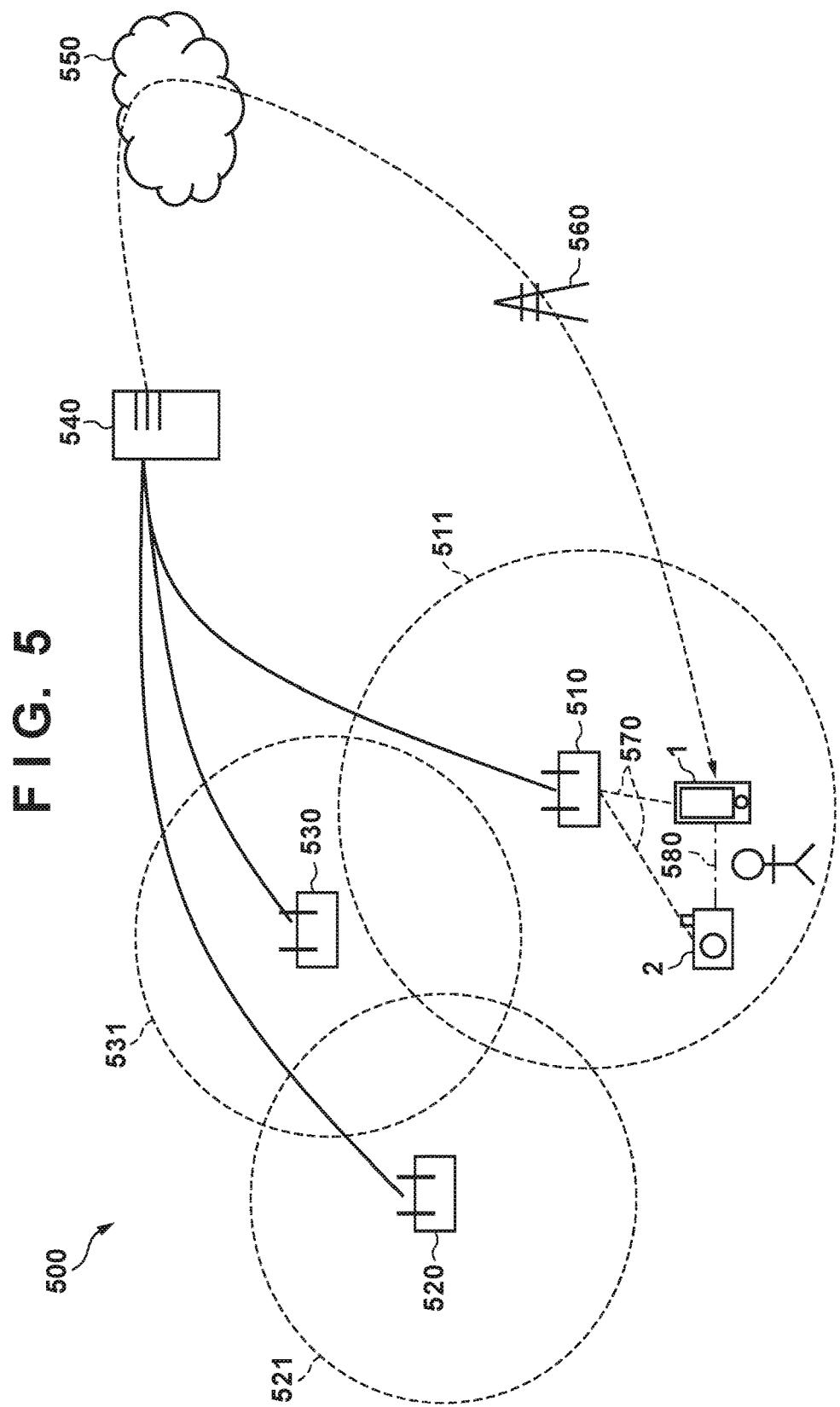

FIG. 6

AP INFORMATION LIST 600

| No. | BSSID | SSID | NUMBER OF CONNECTED TERMINALS | OPERATION STATE |
|---|---|---|---|---|
| 1 | 11:22:33:44:55:01 | NW-XXX | 5 | UNDER OPERATION |
| 2 | 11:22:33:44:55:02 | NW-XXX | 10 | UNDER OPERATION |
| 3 | 11:22:33:44:55:03 | NW-XXX | 20 | UNDER OPERATION |
| 4 | AA:BB:CC:DD:EE:01 | NW-YYY | 0 | FAULT |
| 5 | AA:BB:CC:DD:EE:02 | NW-YYY | 5 | UNDER OPERATION |

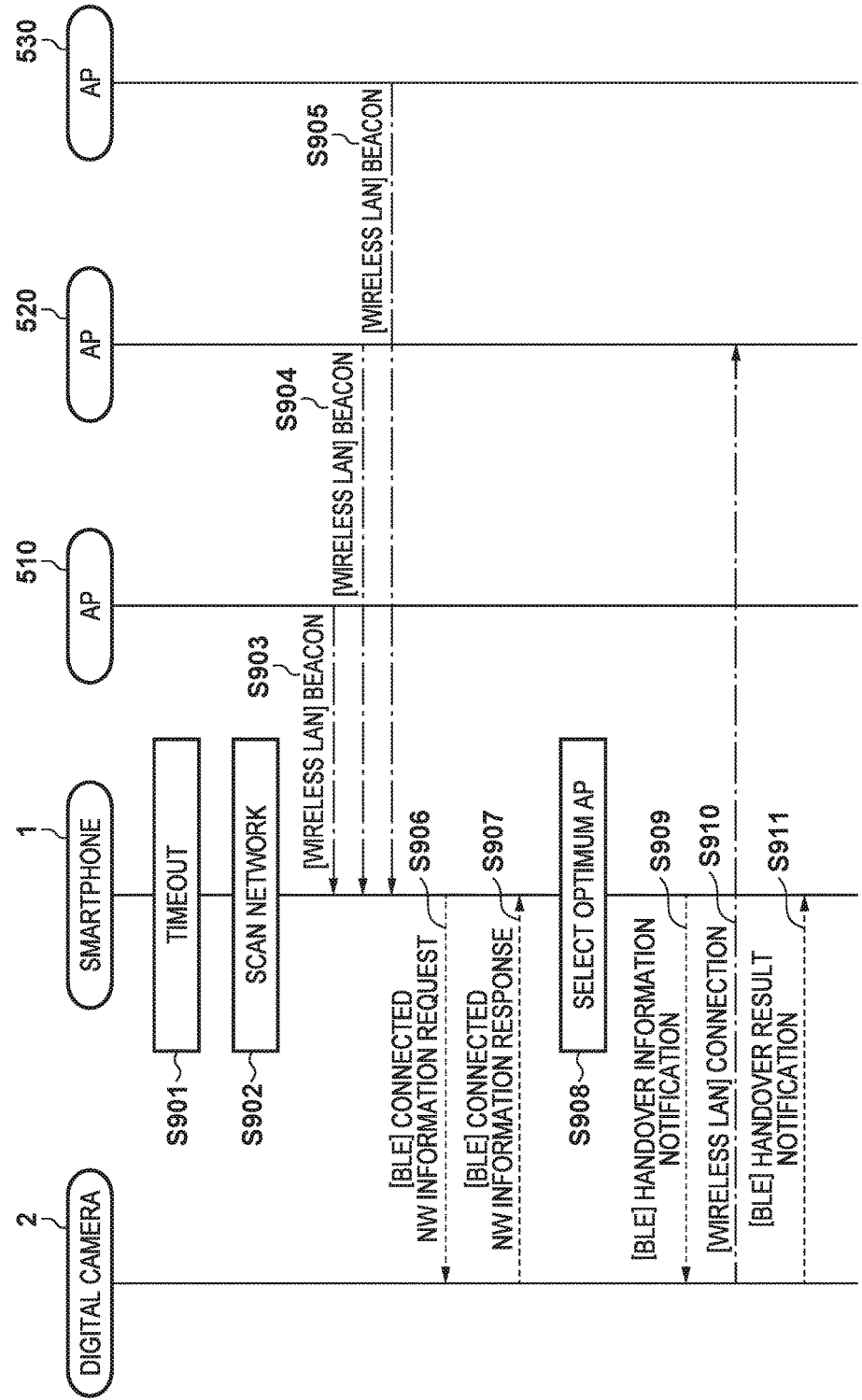

COMMUNICATION APPARATUS, METHOD OF CONTROLLING THE SAME, AND COMMUNICATION SYSTEM

BACKGROUND OF THE INVENTION

Field of the Invention

The present invention relates to a wireless communication technique and, more particularly, to support of a handover process in wireless communication connection.

Description of the Related Art

In recent years, there exist many terminal devices having a wireless LAN function as typified by a smartphone and a digital camera. Japanese Patent Laid-Open No. 2010-124308 (patent literature 1) discloses a digital camera that searches for a wireless LAN access point (to be referred to as an AP hereinafter) while moving, and connects with a detected AP, and downloads data from a server. When moving through a space where a number of APs are placed, the digital camera can continue the wireless LAN communication by automatically switching the AP to be connected using the technique. The process of switching the AP to be connected will be referred to as a handover process hereinafter.

When a communication terminal searches for an AP in the neighborhood, the search process needs to be executed for a frequency (communication channel) used by the AP. Hence, when performing the search process for a frequency different from the frequency of the AP currently connected to the communication terminal, the communication terminal cannot communicate with the currently connected AP. That is, in the technique described in patent literature 1, the digital camera cannot communicate with the server while it is searching for the AP of the handover destination. As a result, the throughput may lower, or a data packet may be lost at the time of handover.

SUMMARY OF THE INVENTION

According to one aspect of the present invention, a communication apparatus comprises: a first obtaining unit configured to obtain an identifier of a first network connected, by a first wireless communication scheme, to another communication apparatus; a search unit configured to search for a second network by the first wireless communication scheme, which exists on the periphery, and obtain an identifier of the second network; and a transmission unit configured to, if the identifier of the first network and the identifier of the second network are different, transmit a predetermined notification signal to the other communication apparatus via communication by a second wireless communication scheme with lower transmission power than the first wireless communication scheme.

The present invention provides a technique capable of more suitably maintaining wireless communication connection.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an example of the hardware arrangement of a communication apparatus (smartphone);

FIG. 2 is a block diagram showing an example of the hardware arrangement of a communication terminal (digital camera);

FIG. 3 is a block diagram for explaining the functional blocks of the communication apparatus;

FIG. 4 is a block diagram for explaining the functional blocks of the communication terminal;

FIG. 5 is a view showing the overall arrangement of a communication system;

FIG. 6 is a view showing an example of an AP information list managed by the communication apparatus;

FIG. 9 is a view for explaining the sequence between the devices in the communication system.

DESCRIPTION OF THE EMBODIMENTS

Figure 7:
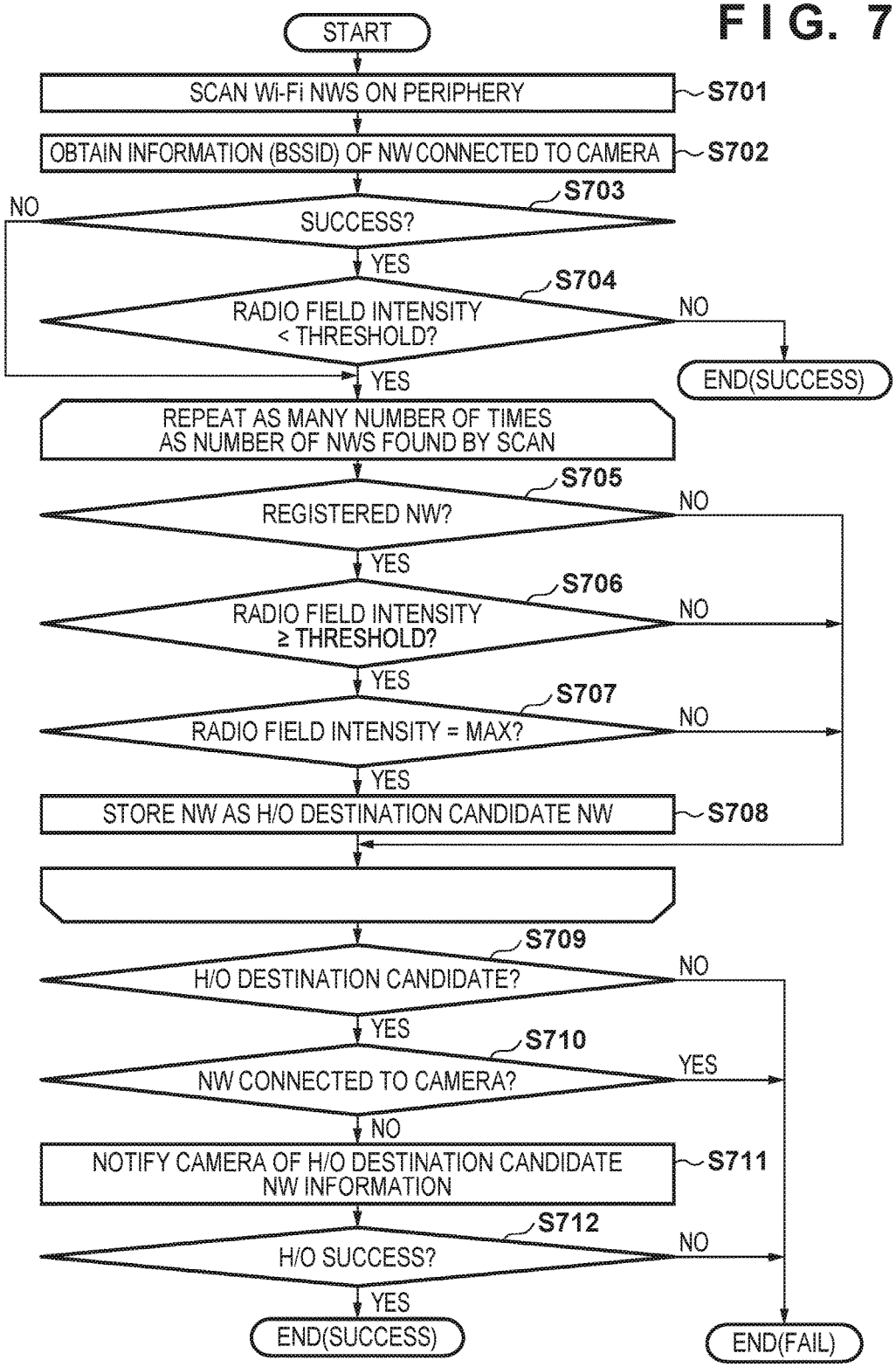
FIG. 7 is an operation flowchart of the communication apparatus.

Preferred embodiments of the present invention will now be described in detail with reference to the accompanying drawings. Note that the following embodiments are merely examples, and the technical scope of the present invention is not limited by the following embodiments.

(First Embodiment)

As a communication apparatus according to the first embodiment of the present invention, a communication apparatus that supports a handover process of a communication terminal that is another communication apparatus will be described below as an example.

<System Arrangement>

FIG. 5 is a view showing the overall arrangement of a communication system 500 including a communication apparatus and a communication terminal. In the following explanation, a smartphone 1 is assumed as the communication apparatus, and a digital camera 2 is assumed as the communication terminal that is another communication apparatus.

In the communication system 500, access points (APs) 510, 520 and 530 of a wireless LAN are arranged. Communication areas 511, 521, and 531 represent communication areas covered by the APs, respectively. A network management server 540 is connected to the APs 510, 520 and 530 via a wired network and manages the operation states of the APs 510, 520 and 530. In addition, a mobile telephone base station 560 to which the smartphone 1 is connected is arranged in the communication system 500, and connected to the network management server 540 via a mobile telephone communication network 550. Hence, the network management server 540 can transmit a message to the smartphone 1 via the mobile telephone communication network 550 and the mobile telephone base station 560.

In the following explanation, a situation in which the smartphone 1 and the digital camera 2 are carried by the same user and move together with the user, as shown in FIG. 5, is assumed. However, the smartphone 1 and the digital camera 2 need only exist at a distance much shorter (for example, several m or less) than the sizes of the communication areas 511, 521, and 531, and need not always be carried by the same user.

The following description will be made assuming that communication 570 between the smartphone 1 and the digital camera 2 and the APs 510, 520 and 530 is communication complying with the wireless LAN standard (first wireless communication scheme). In addition, the description will be made assuming that communication 580 between the smartphone 1 and the digital camera 2 is communication complying with the Bluetooth® Low Energy (to be referred to as BLE hereinafter) standard (second wireless communication scheme). However, another wireless communication standard can also be used.

FIG. 1 is a block diagram showing an example of the hardware arrangement of the smartphone 1 that is a communication apparatus. The smartphone 1 includes a host unit 10 and a BLE control unit 15.

The host unit 10 includes a display unit 100, an operation unit 101, a storage unit 102, a power supply unit 103, a BLE control I/F 104, an imaging unit 105 a control unit 106, a ROM 107, a RAM 108, and a posture detection unit 109. The host unit 10 also includes a wireless LAN antenna control unit 110, a wireless LAN antenna 111, a mobile network communication antenna control unit 112, a mobile network communication antenna 113, a GPS antenna control unit 114, and a GPS antenna 115. GPS is short for Global Positioning System.

The display unit 100 and the operation unit 101 perform display of an application and acceptance of an operation. The storage unit 102 stores and manages various kinds of data such as wireless communication network information, data transmission/reception information, and image data. The power supply unit 103 is, for example, a battery, and supplies power to the host unit 10. The BLE control I/F 104 is an interface connected to the BLE control unit 15. The imaging unit 105 captures a photo or a moving image.

The control unit 106 is, for example, a CPU, and controls the operations of the constituent elements of the smartphone 1. The ROM 107 stores a control instruction, that is, a program. The RAM 108 is used as a work memory or to temporarily store data when executing a program. The posture detection unit 109 is formed from an acceleration sensor, a gravity sensor, an electromagnetic compass, and the like, and detects the posture (direction and the like) and motion of the smartphone 1.

The wireless LAN antenna control unit 110 controls the wireless LAN antenna 111, and performs wireless LAN communication. The mobile network communication antenna control unit 112 controls the mobile network communication antenna 113, and performs mobile network communication. The GPS antenna control unit 114 controls the GPS antenna 115, and receives a signal from a GPS satellite.

The BLE control unit 15 includes a host I/F 150, a power supply unit 151, a ROM 152, a RAM 153, a control unit 154, a BLE antenna control unit 155, and a BLE antenna 156.

The host I/F 150 is an interface connected to the host unit 10. The power supply unit 151 is, for example, a battery, and supplies power to the BLE control unit 15. The ROM 152 stores a control instruction, that is, a program, and particularly stores a program associated with BLE communication. The RAM 153 is used as a work memory or to temporarily store data when executing a program. The control unit 154 is, for example, a CPU, and controls the operations of the constituent elements of the BLE control unit 15. The BLE antenna control unit 155 controls the BLE antenna 156, and performs BLE communication.

With the above-described arrangement, the BLE control unit 15 can operate independently of the host unit 10. That is, even in a case in which the power supply unit 103 stops power supply to the host unit 10, the BLE control unit 15 can be activated by power supply from the power supply unit 151 and communicate with an external apparatus by BLE.

FIG. 2 is a block diagram showing an example of the hardware arrangement of the digital camera 2 that is a communication terminal. The digital camera 2 includes a host unit 20 and a BLE control unit 25. Unlike the smartphone 1, the host unit 20 does not include a posture detection unit, a mobile network communication antenna control unit, a mobile network communication antenna, a GPS antenna control unit, and a GPS antenna. The rest of the arrangement is the same as the smartphone 1, and a description thereof will be omitted here.

FIG. 3 is a block diagram for explaining the functional blocks of the smartphone 1 that is a communication apparatus. Note that the functional blocks to be described below are assumed to be implemented by executing a software program by the control unit 106 or the control unit 154. However, some or all of the functional blocks may be implemented by hardware.

A wireless LAN communication control unit 310 is a processing unit that controls wireless LAN communication via the wireless LAN antenna control unit 110. A BLE communication control unit 320 is a processing unit that controls BLE communication via the BLE antenna control unit 155. A mobile network communication control unit 330 is a processing unit that controls mobile network communication via the mobile network communication antenna control unit 112.

A communication terminal information management unit 340 is a processing unit that obtains the information of the digital camera 2 from the digital camera 2 by BLE communication via the BLE communication control unit 320, and manages the information. The communication terminal information management unit 340 obtains, for example, pieces of information such as the identifier and the operation mode of the digital camera 2 and the identifier of a connected AP, and manages the pieces of information. A communication terminal control unit 350 is a processing unit that transmits a control notification to the digital camera 2 by BLE communication via the BLE communication control unit 320. The communication terminal control unit 350 notifies the digital camera 2 of, for example, the identifier of an AP to be connected to the digital camera 2. An AP information management unit 360 is a processing unit that manages the list of the information of APs that the digital camera 2 can connect with.

FIG. 6 is a view showing an example of an AP information list 600 managed by the AP information management unit 360. The AP information list 600 is stored in the storage unit 102. The data is set/updated according to a user operation or a notification from the network management server 540.

The AP information list 600 manages APs that the digital camera 2 can connect with. Each AP is identified by a BSSID (Basic Service Set Identifier) 610. The AP information list 600 also manages an SSID (Service Set Identifier) 620 of a network generated by each AP, the number 630 of terminals connected to each AP, and an operation state 640 of each AP.

A wireless LAN environment analysis unit 370 is a processing unit that searches for an AP existing on the periphery of the smartphone 1 via the wireless LAN communication control unit 310 and determines an AP to be suitably used by the digital camera 2.

FIG. 4 is a block diagram for explaining the functional blocks of the digital camera 2 that is a communication terminal. Note that the functional blocks to be described below are assumed to be implemented by executing a software program by a control unit 206 or a control unit 254. However, some or all of the functional blocks may be implemented by hardware.

A wireless LAN communication control unit 410 is a processing unit that controls wireless LAN communication via a wireless LAN antenna control unit 209. A BLE communication control unit 420 is a processing unit that controls BLE communication via an BLE antenna control unit 255.

An upload processing unit 430 is a processing unit that transmits a media file stored in a storage unit 202 to an external device via the wireless LAN communication control unit 410. A handover processing unit 440 controls a handover process by the wireless LAN communication control unit 410 based on a notification message received from the smartphone 1 via the BLE communication control unit 420. For example, the handover processing unit 440 instructs the wireless LAN communication control unit 410 to connect with an AP designated by a notification message. The handover processing unit 440 also transmits the information of the AP currently connected to the digital camera 2 to the smartphone 1 in accordance with a request message received from the smartphone 1 via the BLE communication control unit 420.

<Operation of Each Apparatus>

The handover process of the digital camera 2 executed when the user who carries the smartphone 1 and the digital camera 2 moves will be described below.

FIG. 7 is an operation flowchart of the smartphone 1 that is an communication apparatus. More specifically, the smartphone 1 performs a process of deciding an AP as the handover destination of the digital camera 2. This process is steadily executed in the smartphone 1 during the time when the application for implementing the function is active. However, the process may steadily be executed during the time when, for example, the smartphone 1 is active.

In step S701, the wireless LAN environment analysis unit 370 performs a wireless LAN scan process, and collects the information of wireless LAN networks generated by APs existing on the periphery of the smartphone 1. The information of a network collected here includes the BSSID, the SSID, the received signal strength (RSSI), and the communication channel (frequency channel) of each wireless LAN network. As described above, the smartphone 1 and the digital camera 2 exist at a sufficiently short distance (for example, several m or less). That is, the information of wireless LAN networks collected by the wireless LAN environment analysis unit 370 of the smartphone 1 is almost the same as the information of wireless LAN networks collectible by the digital camera 2. Note that the wireless LAN networks collected here can also include a network that the digital camera 2 cannot connect with such as a network generated by an AP placed by a third party.

In step S702, the communication terminal information management unit 340 attempts obtaining, from the digital camera 2, the BSSID of the wireless LAN network connected to the digital camera 2. For example, a connected network information request is transmitted to the digital camera 2 via BLE communication. In step S703, the communication terminal information management unit 340 determines whether BSSID obtaining in step S702 succeeds. If obtaining fails (NO in step S703), considering that the digital camera 2 is not connected to a wireless LAN network, the wireless LAN environment analysis unit 370 determines that new wireless communication connection is necessary, and advances to step S705. On the other hand, if obtaining succeeds (YES in step S703), the process advances to step S704.

In step S704, the wireless LAN environment analysis unit 370 searches for wireless LAN network information obtained in step S701 using the BSSID obtained in step S702 as a key, and measures the radio field intensity of a wireless LAN network with a coincident BSSID. If the radio field intensity (received signal strength) is equal to or more than a given first threshold (NO in step S704), the wireless LAN environment analysis unit 370 determines that the handover of the digital camera 2 is unnecessary, and normally ends the process. If the radio field intensity is less than the first threshold (YES in step S704), the wireless LAN environment analysis unit 370 determines that the handover of the digital camera 2 is necessary, and advances to step S705.

Upon determining that the handover of the digital camera 2 is necessary, the wireless LAN environment analysis unit 370 selects a wireless LAN network candidate suitable as the handover destination of the digital camera 2. More specifically, the wireless LAN environment analysis unit 370 selects a wireless LAN network candidate suitable as the handover destination from the wireless LAN networks obtained in step S701. To select the candidate, the wireless LAN environment analysis unit 370 executes the processes of steps S705 to S708 for each of the wireless LAN networks obtained in step S701.

In step S705, the wireless LAN environment analysis unit 370 determines whether the BSSID of the current wireless LAN network of interest is registered in the AP information list 600. If the BSSID of the wireless LAN network of interest is registered in the AP information list 600 (YES in step S705), the process advances to step S706. On the other hand, if the BSSID is not registered (NO in step S705), the wireless LAN environment analysis unit 370 determines that the current wireless LAN network of interest is not a handover destination candidate.

In step S706, the wireless LAN environment analysis unit 370 determines whether the radio field intensity (received signal strength) of the current wireless LAN network of interest is equal to or more than a preset second threshold. Note that the second threshold can be either equal to or different from the first threshold used in step S704. For example, to lower the frequency of the handover process, the second threshold may be set to a value larger than the first threshold. If the radio field intensity is equal or to more than the second threshold (YES in step S706), the process advances to step S707. On the other hand, if the radio field intensity is less than the second threshold (NO in step S706), the wireless LAN environment analysis unit 370 determines that the current wireless LAN network of interest is not a handover destination candidate.

In step S707, the wireless LAN environment analysis unit 370 determines whether the radio field intensity of the current wireless LAN network of interest is higher than the radio field intensity of a wireless LAN network that is a previously stored handover destination candidate. If the radio field intensity of the current wireless LAN network of interest is higher (YES in step S707), the process advances to step S708. On the other hand, if the radio field intensity of the current wireless LAN network of interest is lower (NO in step S707), the wireless LAN environment analysis unit 370 determines that the current wireless LAN network of interest is not a handover destination candidate.

In step S708, the wireless LAN environment analysis unit 370 stores the current wireless LAN network of interest as a wireless LAN network of a handover destination candidate.

When the above-described processes of steps S705 to S708 are completed for all wireless LAN networks obtained in step S701, the process advances to step S709. One of unprocessed wireless LAN networks is selected, and the determination processes of step S705 to S708 are executed.

In step S709, the wireless LAN environment analysis unit 370 determines whether a handover destination candidate stored in step S708 exists. If a handover destination candidate does not exist (NO in step S709), the smartphone 1 determines that no handover destination candidate can be found regardless of the necessity of handover of the digital camera 2, and ends the process with a processing result "failure". If a handover destination candidate exists (YES in step S709), the process advances to step S710.

In step S710, the wireless LAN environment analysis unit 370 determines whether the handover destination candidate stored in step S708 is the same as the network connected to the digital camera 2. If the handover destination candidate is the same as the network (YES in step S710), the smartphone 1 determines that no handover destination candidate can be found regardless of the necessity of handover of the digital camera 2, and ends the process with a processing result "failure". If the handover destination candidate is different from the network connected to the digital camera 2 (NO in step S710), the process advances to step S711. By performing the determination in step S710, an unnecessary notification message between the smartphone 1 and the digital camera 2 can be suppressed in the subsequent process.

In step S711, the communication terminal control unit 350 transmits a handover information notification (predetermined notification signal) to the digital camera 2 by BLE communication. Note that the handover information notification transmitted in step S711 includes, for example, the wireless communication settings (the BSSID, the SSID, the communication channel, and the like) of the handover destination candidate. That is, the handover information notification includes wireless communication settings corresponding to a wireless LAN network of the highest received signal strength out of the wireless LAN networks obtained in step S701.

In step S712, the communication terminal control unit 350 receives a response message to the notification transmitted in step S711 from the digital camera 2. The communication terminal control unit 350 determines, based on data representing the processing result included in the response message, whether the handover process succeeds in the digital camera 2. If the handover process succeeds in the digital camera 2 (YES in step S712), the smartphone 1 normally ends the process. If the handover process fails in the digital camera 2 (NO in step S712), the smartphone 1 ends the process with a processing result "failure".

Figure 8:
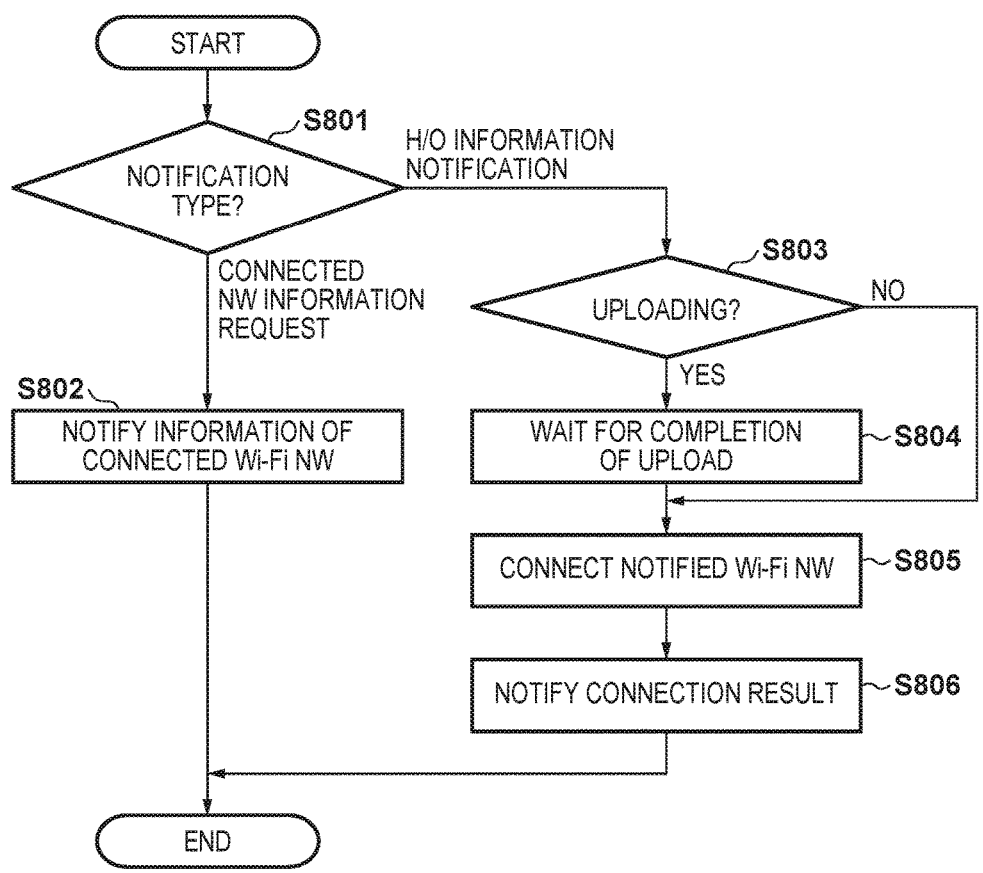
FIG. 8 is an operation flowchart of the communication terminal.

FIG. 8 is an operation flowchart of the digital camera 2 that is a communication terminal. This process is executed when the BLE communication control unit 420 of the digital camera 2 receives a notification message of BLE from the smartphone 1. The notification message is the above-described connected network information request transmitted in step S702 or the handover information notification transmitted in step S711.

In step S801, the BLE communication control unit 420 determines the type of the message based on the data of the received notification message. If the message type is the connected network information request ("connected NW information request" in step S801), the process advances to step S802. On the other hand, if the message type is the handover information notification ("H/O information notification" in step S801), the process advances to step S803.

In step S802, the handover processing unit 440 obtains currently connected wireless LAN network information from the wireless LAN communication control unit 410. The handover processing unit 440 transmits the obtained wireless LAN network information to the smartphone 1 via the BLE communication control unit 420 as a response message to the connected network information request. The wireless LAN network information notified here includes the BSSID of the wireless LAN network connected to the digital camera 2. If the digital camera 2 is not connected to any wireless LAN network, the handover processing unit 440 transmits, to the smartphone 1, a response message representing that the digital camera 2 is not connected to any wireless LAN network.

In step S803, the upload processing unit 430 determines whether the digital camera 2 is uploading media data. If the digital camera 2 is uploading media data (YES in step S803), the digital camera 2 waits for completion of the transmission process (step S804). After completion of upload, the process advances to step S805. On the other hand, if the digital camera 2 is not uploading media data, the process immediately advances to step S805.

In step S805, the handover processing unit 440 requests the wireless LAN communication control unit 410 to connect with the wireless LAN network using the wireless communication settings (the BSSID, the SSID, the communication channel, and the like) included in the received handover information notification.

In step S806, the handover processing unit 440 obtains the result of connection processing (network switching process) by the wireless LAN communication control unit 410. The handover processing unit 440 notifies the smartphone 1 of the result by a handover result notification message via the BLE communication control unit 420.

<Example of Operation Sequence>

FIG. 9 is a view for explaining the sequence between the devices in the communication system 500. A sequence performed when the user who carries the smartphone 1 and the digital camera 2 moves from the vicinity of the AP 510 in the direction of the AP 520 is exemplarily illustrated here. Note that the smartphone 1 and the digital camera 2 complete the connection process (pairing) of BLE communication before the start of the processing. In addition, the digital camera 2 is connected to the AP 510 by a wireless LAN.

In step S901, the smartphone 1 waits for timeout of a timer of a designated time. Upon timeout, the wireless LAN environment analysis unit 370 collects the information of wireless LAN networks generated by APs existing on the periphery of the smartphone 1 (steps S903 to S905).

Here, the wireless LAN environment analysis unit 370 receives beacons of wireless LAN transmitted from the APs 510, 520, and 530. The wireless LAN environment analysis unit 370 then collects the BSSID, the SSID, the radio field intensity, and the communication channel of each wireless LAN network from each beacon. Note that here, the beacon of the network formed by the AP 520 has the highest radio field intensity, and the beacon of the AP 510 has a radio field intensity less than the first threshold.

In step S906, the communication terminal information management unit 340 of the smartphone 1 transmits a connected network information request to the digital camera 2 by BLE communication.

In step S907, the handover processing unit 440 of the digital camera 2 notifies the smartphone 1 of a response message to the connected network information request received from the smartphone 1. Since the digital camera 2 is connected to the AP 510, a response message including the BSSID of the wireless LAN network of the AP 510 is notified to the smartphone 1.

In step S908, based on the data collected in steps S902 to S905, the wireless LAN environment analysis unit 370 of the smartphone 1 selects the wireless LAN network formed by the AP 520 as the handover destination candidate for the digital camera.

In step S909, the communication terminal control unit 350 of the smartphone 1 transmits a handover information notification to the digital camera 2. The handover information notification includes the wireless communication settings (the BSSID, the SSID, the communication channel, and the like) of the wireless LAN network formed by the AP 520.

In step S910, the handover processing unit 440 of the digital camera 2 performs the wireless LAN connection process (handover process) to the AP 520 based on the wireless communication settings received in step S909. In step S911, the handover processing unit 440 of the digital camera 2 notifies the smartphone 1 of the result of the connection process by a handover result notification message.

As described above, according to the first embodiment, the smartphone 1 can provide the digital camera 2 with wireless communication settings necessary to appropriately maintain the wireless communication connection in the digital camera 2. That is, the digital camera 2 can more appropriately maintain the wireless communication connection. Hence, in a use state in which the user transmits a captured image while moving with the digital camera 2 carried on him/her, the communication speed can be improved, and occurrence of errors due to communication disconnection can be suppressed.

(Modification)

In the above-described first embodiment, the smartphone 1 steadily executes the process shown in FIG. 7. However, the process may be executed when, for example, the posture detection unit 109 or the GPS antenna control unit 114 detects the movement of the smartphone 1.

Additionally, the period to execute the process shown in FIG. 7 may be changed in accordance with the radio field intensity of the AP connected to the digital camera 2. For example, if the radio field intensity of the AP connected to the digital camera 2 is high, the period may be long. If the radio field intensity is low, the period may be short. The smartphone 1 may obtain the operation mode of the digital camera 2 by BLE communication, and change the period to execute the process shown in FIG. 7 in accordance with the obtained operation mode. For example, if the digital camera 2 is in an operation mode in which wireless LAN communication cannot immediately be started, the period is made long. On the other hand, if the digital camera 2 is in an operation mode in which wireless LAN communication can immediately be started, the period is shortened.

With this arrangement, if the necessity of handover in the digital camera 2 is low, the number of times of unnecessary search processes in the smartphone 1 can be decreased, and the smartphone 1 can be expected to save power.

In the above explanation, the smartphone 1 obtains the connected network information of the digital camera 2 using BLE communication. However, the obtaining method is not limited to this. That is, substantially, the smartphone 1 need only be able to detect the wireless LAN network connected to the digital camera 2 by some method. For example, the smartphone 1 may be configured to obtain the identifier of the AP connected to the digital camera 2 from a management apparatus (for example, the network management server 540) that manages the APs.

Similarly, the smartphone 1 notifies the digital camera 2 of the network information of the handover destination using BLE communication. However, the notification method is not limited to this. For example, the smartphone 1 may be configured to notify the network information of the handover destination via the wireless LAN network currently connected to the digital camera 2.

In the above description of steps S705 to S708, the radio field intensities of the wireless LAN networks are compared, and a network having the highest radio field intensity is decided as the handover destination candidate. However, the deciding method is not limited to this. For example, the data rates (transmission rates) of the networks may be compared, and a network having the highest date rate may be decided as the handover destination candidate.

Alternatively, the numbers 630 of terminals connected to APs managed on the AP information list 600 may be compared, and the network of an AP whose number of connected terminals is smallest may be decided as the handover destination candidate. Otherwise, handover destination candidates may be limited based on the operation state 640 of each AP managed on the AP information list 600. For example, APs in a fault state may be excluded, and the radio field intensities, data rates, or numbers of connected terminals may then be compared.

In the above description, only one handover destination candidate is notified. However, a plurality of handover destination candidates may be notified. For example, all APs whose radio field intensities exceed a predetermined threshold (for example, the second threshold) may be notified as handover destination candidates. In this case, the digital camera 2 is connected to one of the networks of the plurality of handover destination candidates, and notifies the smartphone 1 of the identifier (BSSID) of the connected network together with the connection result.

The comparison method may be switched based on the type of the communication process performed by the digital camera 2, for example, whether the smartphone 1 is moving. For example, when the posture detection unit 109 of the smartphone 1 detects the movement of the smartphone 1, the handover destination candidate may be selected using the radio field intensity. When the movement is not detected, the handover destination candidate may be selected using the data rate. Alternatively, in a mode in which the digital camera 2 transmits data in a large capacity, the handover destination candidate may be selected using the data rate. Otherwise, the handover destination candidate may be selected using the radio field intensity.

When the smartphone 1 notifies the digital camera 2 of the handover destination candidate, the wireless communication settings (the BSSID, the SSID, and the communication channel) are notified. However, the information to be notified is not limited to these. For example, the identification number of AP settings predetermined between the smartphone 1 and the digital camera 2 may be notified. Alternatively, instead of making the smartphone 1 notify the wireless communication settings, the digital camera 2 that has received a notification may perform the wireless LAN network scan process. That is, the smartphone 1 may be configured to provide only the timing of handover to the digital camera 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-006557, filed Jan. 15, 2016 which is hereby incorporated by reference herein in its entirety.

What is claimed is:

1. A communication apparatus comprising:
one or more processors that cause the communication apparatus to:
obtain information of a first wireless network generated by a first other communication apparatus from a second other communication apparatus, wherein the second other communication apparatus connects to the first wireless network by a first wireless communication scheme;
search for a wireless network by the first wireless communication scheme;
determine, based on the information of the first wireless network obtained from the second other communication apparatus, whether the first wireless network to which the second other communication apparatus is connected and the wireless network detected by the search are different; and
transmit, if it is determined that the first wireless network to which the second other communication apparatus is connected and the wireless network detected by the search are different, a predetermined notification signal to the second other communication apparatus via communication by a second wireless communication scheme having lower transmission power than the first wireless communication scheme, and
not transmit, if it is determined that the first wireless network to which the second other communication apparatus is connected and the wireless network detected by the search are not different, the predetermined notification signal to the second other communication apparatus.

2. The apparatus according to claim 1, wherein the predetermined notification signal includes a wireless communication setting necessary to connect the wireless network detected by the search.

3. The apparatus according to claim 1, wherein the one or more processors further cause the communication apparatus to obtain a received signal strength of the first wireless network, and
wherein if the received signal strength of the first wireless network is higher than a first threshold, the communication apparatus does not transmit the predetermined notification signal.

4. The apparatus according to claim 1, wherein the one or more processors further cause the communication apparatus to obtain a received signal strength of the wireless network detected by the search, and
wherein if the received signal strength of the wireless second network detected by the search is lower than a second threshold, the communication apparatus does not transmit the predetermined notification signal.

5. The apparatus according to claim 3, wherein the one or more processors further cause the communication apparatus to obtain a received signal strength of the wireless network detected by the search, and
wherein, if the received signal strength of the wireless network detected by the search is lower than a second threshold larger than the first threshold, the communication apparatus does not transmit the predetermined notification signal.

6. The apparatus according to claim 1, wherein, if a plurality of wireless networks are detected by the search, a wireless communication setting corresponding to a network having a highest received signal strength in the plurality of wireless networks is notified to the second other communication apparatus.

7. The apparatus according to claim 1, wherein the information comprises an SSID (Service Set Identifier) of the first wireless network.

8. The apparatus according to claim 1, wherein the information comprises a BSSID (Basic Service Set Identifier) of an access point that forms the first wireless network.

9. The apparatus according to claim 1, wherein the communication apparatus obtains the information of the first wireless network via communication by the second wireless communication scheme.

10. A method of controlling a communication apparatus, the method comprising:
obtaining information of a first wireless network generated by a first other communication apparatus from a second other communication apparatus, wherein the second other communication apparatus connects to the first wireless network by a first wireless communication scheme;
searching for a wireless network by the first wireless communication scheme;
determining, based on the information of the first wireless network obtained from the second other communication apparatus, whether the first wireless network to which the second other communication apparatus is connected and the wireless network detected by the search are different;
transmitting, if it is determined that the first wireless network to which the second other communication apparatus is connected and the wireless network detected by the search are different, a predetermined notification signal to the second other communication apparatus via communication by a second wireless communication scheme having lower transmission power than the first wireless communication scheme, and not transmitting, if it is determined that the first wireless network to which the second other communication apparatus is connected and the wireless network detected by the sear are not different, the predetermined notification signal to the second other communication apparatus.

11. A communication system including a first communication apparatus and a second communication apparatus for controlling the first communication apparatus, wherein the second communication apparatus comprises:
one or more processors that cause the second communication apparatus to
obtain information of a first wireless network generated by a third communication apparatus from the first communication apparatus, wherein the first communication apparatus connects to the first wireless network by a first wireless communication scheme;
search for a wireless network by the first wireless communication scheme;
transmit, if it is determined that the first wireless network to which the first communication apparatus is connected and the wireless network detected by the search are different, a predetermined notification signal to the first communication apparatus via communication by a second wireless communication scheme having lower transmission power than the first wireless communication scheme, and
not transmit, if it is determined that the first wireless network to which the first communication apparatus is connected and the wireless network detected by the search are not different, the predetermined notification signal to the second other communication apparatus; and the first communication apparatus comprises a switching unit configured to execute a process of switching a network to be connected by the first wireless communication scheme based on the predetermined notification signal transmitted by the transmission unit.

12. A non-transitory computer-readable recording medium storing a program that causes a computer to perform a method of controlling a communication apparatus, the method comprising:

obtaining information of a first wireless network generated by a first other communication apparatus from a second other communication apparatus, wherein the second other communication apparatus connects to the first wireless network by a first wireless communication scheme;

searching for a wireless network by the first wireless communication scheme;

determining, based on the information of the first wireless network obtained from the second other communication apparatus, whether the first wireless network to which the second other communication apparatus is connected and the wireless network detected by the search are different;

transmitting, if it is determined that the first wireless network to which the second other communication apparatus is connected and the wireless network detected by the search are different, a predetermined notification signal to the second other communication apparatus via communication by a second wireless communication scheme having lower transmission power than the first wireless communication scheme, and not transmitting, if it is determined that the first wireless network to which the second other communication apparatus is connected and the wireless network detected by the sear are not different, the predetermined notification signal to the second other communication apparatus.

* * * * *